US009807282B2

(12) United States Patent
Kishi

(10) Patent No.: US 9,807,282 B2
(45) Date of Patent: Oct. 31, 2017

(54) SYNCHRONOUS CAMERA

(71) Applicant: TOSHIBA TELI CORPORATION, Tokyo (JP)

(72) Inventor: Junji Kishi, Tokyo (JP)

(73) Assignee: TOSHIBA TELI CORPORATION, Tokyo (JP)

( * ) Notice: Subject to any disclaimer, the term of this patent is extended or adjusted under 35 U.S.C. 154(b) by 0 days.

(21) Appl. No.: 15/132,881

(22) Filed: Apr. 19, 2016

(65) Prior Publication Data

US 2016/0234404 A1 Aug. 11, 2016

Related U.S. Application Data

(63) Continuation of application No. PCT/JP2013/081648, filed on Nov. 25, 2013.

(30) Foreign Application Priority Data

Nov. 11, 2013 (JP) .................................. 2013-233304

(51) Int. Cl.
*H04N 5/225* (2006.01)
*H04N 5/232* (2006.01)
(Continued)

(52) U.S. Cl.
CPC ........... *H04N 5/04* (2013.01); *G06F 13/4282* (2013.01); *H04N 5/23203* (2013.01); *H04N 5/247* (2013.01)

(58) Field of Classification Search
CPC ...... H04N 5/23203; H04N 5/247; H04N 5/04; H04N 5/0733; G06F 13/4282
See application file for complete search history.

(56) References Cited

U.S. PATENT DOCUMENTS 5,574,752 A * 11/1996 Juri .......................... H04N 7/56
348/464
5,915,130 A * 6/1999 Kim .................... G06F 13/4291
345/520

(Continued)

FOREIGN PATENT DOCUMENTS

EP      1 102 489 A1    5/2001
JP      2002-247408 A    8/2002

(Continued)

OTHER PUBLICATIONS

Written Opinion of the International Searching Authority mailed by the International Searching Authority (ISA/JP) dated May 26, 2016 in connection with PCT International Application No. PCT/JP2013/081648, filed Nov. 25, 2013.

(Continued)

*Primary Examiner* — Lin Ye
*Assistant Examiner* — John H Morehead, III
(74) *Attorney, Agent, or Firm* — John P. White; Cooper & Dunham LLP

(57) ABSTRACT

According to one embodiment, a low-pass filter operation circuit constitutes a serial interface, which enables communication conforming to the serial bus standard including IEEE 1394 & USB 3.0, together with a timer register, a packet receiving circuit, and a packet transmitting circuit. The low-pass filter operation circuit performs a correction of gradually increasing or decreasing an internal timer value counted by the timer register by a unit count value thereof, thereby converging the deviation. A timer operation circuit calculates a timer reference value, corresponding to the timing at which sync. should be done next, common to cameras, based on a timer value in the timer register, and a frame rate generated by CPU.

5 Claims, 4 Drawing Sheets

(51) Int. Cl.
*H04N 5/04* (2006.01)
*G06F 13/42* (2006.01)
*H04N 5/247* (2006.01)

(56) References Cited

U.S. PATENT DOCUMENTS

| | | | |
|---|---|---|---|
| 7,486,308 | B1 | 2/2009 | Kori et al. |
| 2001/0022823 | A1 | 9/2001 | Renaud |
| 2006/0274152 | A1* | 12/2006 | Low ........................ H04N 5/232 348/207.1 |
| 2007/0116062 | A1 | 5/2007 | Spalink |
| 2007/0242377 | A1 | 10/2007 | Hiura et al. |
| 2008/0259221 | A1* | 10/2008 | Longchambon .. H04M 1/72527 348/739 |
| 2009/0121925 | A1* | 5/2009 | Scott ........................ G01S 3/784 342/195 |
| 2009/0251601 | A1* | 10/2009 | Ihlefeld ................ H04N 5/0733 348/521 |
| 2011/0249132 | A1* | 10/2011 | Murayama ........... H04N 5/0733 348/211.2 |
| 2011/0317049 | A1* | 12/2011 | Kurane ............. H04N 5/23203 348/294 |

FOREIGN PATENT DOCUMENTS

| | | |
|---|---|---|
| JP | 2006-203817 A | 8/2006 |
| JP | 2007-280459 | 10/2007 |
| JP | 2009-17413 A | 1/2009 |
| JP | 2011-155410 A | 8/2011 |
| WO | WO 00/72597 A1 | 11/2000 |

OTHER PUBLICATIONS

International Search Report dated Feb. 25, 2014 in connection with PCT International Application No. PCT/JP2013/081648, filed Nov. 25, 2013.
Extended European Search Report in connection with European Patent Application No. EP 13 897 245.0.

* cited by examiner

SYNCHRONOUS CAMERA

CROSS REFERENCE TO RELATED APPLICATIONS

This application is a Continuation Application of PCT Application No. PCT/JP2013/081648, filed Nov. 25, 2013 and based upon and claiming the benefit of priority from Japanese Patent Application No. 2013-233304, filed Nov. 11, 2013, the entire contents of all of which are incorporated herein by reference.

FIELD

Embodiments described herein relate generally to a synchronous camera connected to a serial bus such as IEEE 1394 or USB 3.0.

BACKGROUND

As the means for synchronously operating a plurality of cameras connected to a serial bus such as IEEE 1394 or USB 3.0, conventionally, there are a structure in which a synchronization signal generation means is provided outside the cameras, and a structure in which a synchronization signal generation means is embedded within the cameras.

In a structure in which the synchronization signal generation means is provided outside the cameras, separately from bus connection by means of a serial bus, a synchronization signal generator, and a dedicated signal line for synchronization which supplies a synchronization signal output from the synchronization signal generator to each of the cameras are provided externally. By supplying a synchronization signal output from the synchronization signal generator to each of the cameras via the dedicated signal line for synchronization, synchronous control is performed for each of the cameras connected to the serial bus.

Further, in a structure in which the synchronization signal generation means is embedded in each of the cameras, a synchronization signal generation circuit for realizing synchronization between the cameras is provided in each camera connected to the serial bus. The synchronization signal generation circuit embedded in each camera generates a synchronization signal by using a specific packet over the serial bus.

Of the above-described structures, a system structure in which a synchronization signal generation means is provided outside the cameras has a problem that the structure of the whole system becomes complicated since this structure requires a synchronization signal generator to be provided externally, separately from the camera connection structure via the serial bus, and a synchronization signal output from such a synchronization signal generator is supplied to each camera through a dedicated signal line for synchronization. Further, in the structure in which the synchronization signal generation means is embedded in each camera, a synchronization signal generator embedded in each camera generates a synchronization signal by using a value of a specific packet issued from another apparatus on the control side and a signal of predetermined intervals generated within the camera. For this reason, this structure has a problem that the structure of a synchronization control circuit within the camera becomes complicated.

Accordingly, the applicant of the present application has realized a synchronous camera capable of easily constructing a camera system which synchronously controls a plurality of cameras over the IEEE 1394 bus with an economically advantageous structure.

The synchronous camera as described above has the feature that a system structure for synchronization and the structure within the camera can be simplified, and that the camera system which synchronously controls a plurality of cameras over the IEEE 1394 bus is thereby easily constructed with an economically advantageous structure. However, the aforementioned structure causes a problem that a certain level of reliability cannot be ensured for other high-speed serial bus interfaces (for example, a USB 3.0 serial bus interface) which allow greater fluctuation in packet arrival time as compared to synchronous control over the IEEE 1394 bus.

The embodiment has been achieved in light of the above points, and is intended to provide a synchronous camera which can easily construct a camera system capable of performing highly reliable synchronous control between cameras, which is targeted for several kinds of high-speed serial bus including USB 3.0, with an economically advantageous structure.

DETAILED DESCRIPTION

Figure 1:
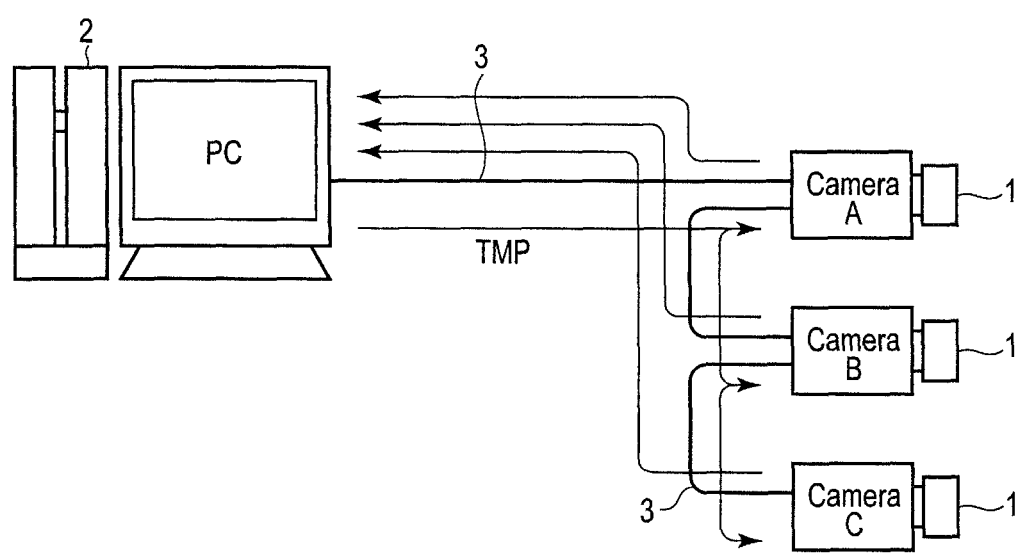
FIG. 1 is a configuration example of a camera system employing serial interface bus connection, which is constructed by using a plurality of synchronous cameras according to the embodiment.

Embodiments will be described with reference to the drawings.

A synchronous camera according to the embodiment is of the type that a plurality of synchronous cameras are connected to an external controller via a serial bus, and is synchronously controlled in accordance with a frame rate set by the controller. The synchronous camera comprises: a receiver configured to receive a packet to which a timer value is added (a packet which carries a timer value), which is issued from the controller at regular intervals; a timer register which performs a count operation of an internal timer value corresponding to the timer value carried by the packet; a low-pass filter operation processor configured to compare the timer value carried by the packet with the internal timer value counted by the timer register, and correcting the internal timer value so that it becomes close to the timer value carried by the packet; an operator configured to calculate a timer reference value common to the plurality of cameras connected to the serial bus, on the basis of the internal timer value output from the timer register and the frame rate; and a transmitter configured to transmit a captured image frame to the controller via the serial bus, on the basis of the timer reference value calculated by the operator.

Further, in the synchronous camera, the low-pass filter operation processor is characterized in that it comprises hardware logic. More specifically, the low-pass filter operation processor is configured to: form a negative feedback loop between the low-pass filter operation processor and the timer register; compare the timer value carried by the packet with the internal timer value counted by the timer register; and in this comparison, if a deviation which is multiples of a unit count value (a deviation of multiple counts) occurs in the count value of the timer register, every time a packet to which the timer value is added is received, gradually increase or decrease the internal timer value counted by the timer register by the unit count value of the timer register, thereby converging the deviation.

With the synchronous camera according to the embodiment, it is possible to easily construct a camera system capable of performing highly reliable synchronous control between cameras, which is targeted for several kinds of high-speed serial bus including USB 3.0, with an economically advantageous structure.

A synchronous camera according to the embodiment converges a deviation of an internal timer value by a low-pass filter operation circuit, on the basis of timer information (i.e., a cycle timer in the IEEE 1394, and an isochronous time stamp in the USB 3.0) exhibited by, for example, IEEE 1394 and USB 3.0 conforming to a high-speed serial bus standard. Further, by calculating a timer reference value common to cameras for synchronously operating the cameras by a timer operation circuit, image frames captured by the respective cameras are transmitted to an external controller via the serial bus, on the basis of the timer reference value calculated by the timer operation circuit. A specific structure of the synchronous camera will be described later with reference to FIGS. 2 to 4.

FIG. 1 shows a configuration example of a camera system employing serial interface bus connection, which is constructed by using a plurality of synchronous cameras according to the embodiment.

As shown in FIG. 1, the camera system comprises a plurality of synchronous cameras (hereinafter simply referred to as cameras) 1, ... 1, an external controller 2, and a high-speed serial bus (hereinafter simply referred to as a serial interface bus) 3, such as IEEE 1394 or USB 3.0 exhibiting timer information in the bus standard, which enables real time image transmission by the plurality of cameras. Here, although an example in which three cameras (camera A, camera B, and camera C) are connected to the serial interface bus 3 is shown, more cameras can be connected provided that the bus standard allows such connection.

Of the above constituent elements, each of cameras 1, ... , 1 comprises a serial interface circuit (reference number 11 shown in FIG. 2) to be described later, establishes interface connection with the external controller 2 via the serial interface bus 3, and transmits image frames captured at a timing common to the cameras 1, ... , 1 to the external controller 2.

Each of the cameras 1, ... , 1 receives a frame rate common to these cameras 1, ... , 1 from the external controller 2, and also receives a packet (TMP) to which a timer value is added that is issued at regular intervals. Each of the cameras 1, ... , 1 comprises first processor, second processor, and third processor. The first processor compares, every time the packet is received, a timer value carried by the packet with an internal timer value counted by a timer register which performs a count operation of the internal timer value corresponding to the timer value. The first processor corrects the internal timer value by a low-pass filter operation process so that it becomes close to the timer value carried by the packet, and converges a deviation of the internal timer count. The second processor calculates a timer reference value common to the cameras 1, ... 1 connected to the serial interface bus 3, on the basis of the internal timer value output from the timer register via the first processor and the frame rate. The third processor transmits a captured image frame to the external controller 2 via the serial interface bus 3, on the basis of the timer reference value calculated by the second processor. In the above, the packet (TMP) to which the timer value is added that is issued at regular intervals from the external controller 2 is issued for prompting synchronization of bus timing to all devices connected to the same bus. In the case of IEEE 1394, such a packet may be a "cycle start packet", and in the case of USB 3.0, such a packet may be an "isochronous time stamp packet". In either case, the packet is issued in a bus cycle of predetermined intervals (for example, every 125 μsec).

The external controller 2 sets a frame rate common to the cameras 1, ... , 1, based on an operating condition of the camera, such as the shutter speed and/or image size, which is set in advance to a setting condition holding module (refer to reference number 14a shown in FIG. 2) of the cameras 1, ... , 1. Then, the external controller transfers this frame rate to each of the cameras 1, ... , 1 via the serial interface bus 3 in accordance with the start of a system operation. Also, when the system operation is started, the packet (TMP) to which the timer value is added is transmitted through the serial interface bus 3 in the bus cycle of the predetermined intervals.

The serial interface bus 3 is a high-speed serial bus which is used for packet transfer of data exchanged between the external controller 2 and the respective cameras 1, ... , 1. In this embodiment, the serial interface bus 3 is realized by a high-speed serial bus such as IEEE 1394 or USB 3.0, and is used for transfer of a frame rate from the external controller 2 to the respective cameras 1, ... , 1, transfer of the packet (TMP) to which the timer value is added, transfer of image frames from the respective cameras 1, ... , 1 to the external controller 2, and the like. The serial interface bus 3 is not limited to the above-described IEEE 1394 and USB 3.0, and the other high-speed serial bus which exhibits timer information conforming to the bus standard may be employed.

In the camera system shown in FIG. 1, the external controller 2 periodically issues a packet (TMP) to which a timer value is added. The packet (TMP) to which the timer value is added is transmitted to each of the cameras 1, ... , 1 via the serial interface bus 3. Each of the cameras 1, ... , 1 receives the packet (TMP) to which the timer value is added. Each of these cameras performs a predetermined operation based on a timer value carried by the received packet, and a frame rate which conforms to an operating condition of the cameras 1, ... , 1 (the setting conditions such as the image size and/or the shutter speed) which has been set. Then, each of these cameras calculates a timer reference value common to the cameras 1, ... , 1. Control of image output timing is performed based on the calculated timer value common to the cameras 1, ... , 1 (a common timer value). In this way, the cameras 1, ... , 1 are all operated periodically synchronized. At this time, the frame rate which conforms to the operating condition of the cameras 1, ... , 1 (the setting conditions such as the image size and/or the shutter speed) is the same in these cameras, and thus, the respective cameras 1, ... , 1 are operated with the same synchronization signal.

More specifically, an image pickup timing, an image output timing, etc., are synchronously controlled among the cameras. Taking the image output timing as an example, each of the cameras 1, ..., 1 waits until the timing reaches the timer reference value common to the cameras, and then outputs an image frame. In this way, image data output is normalized by the common timer reference value. Since all of the cameras 1, ..., 1 are normalized by the common timer reference value, mutual synchronous operation of the cameras 1, ..., 1 is realized as a consequence.

Figure 2:
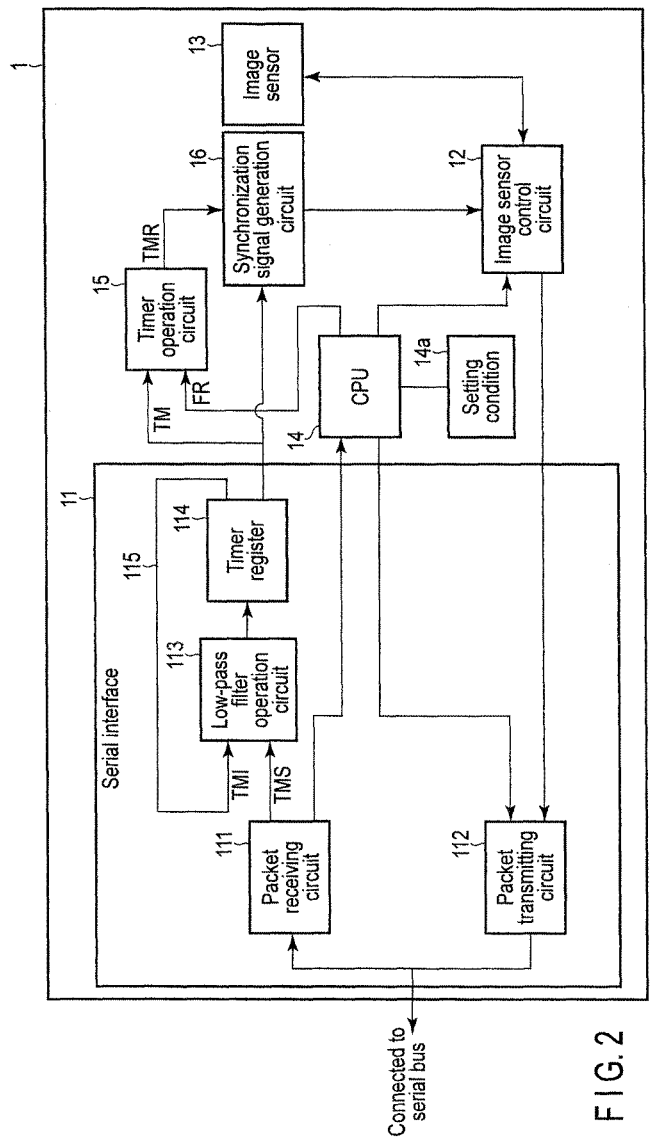
FIG. 2 is a block diagram showing the structure of the synchronous camera according to the embodiment.
Figure 3:
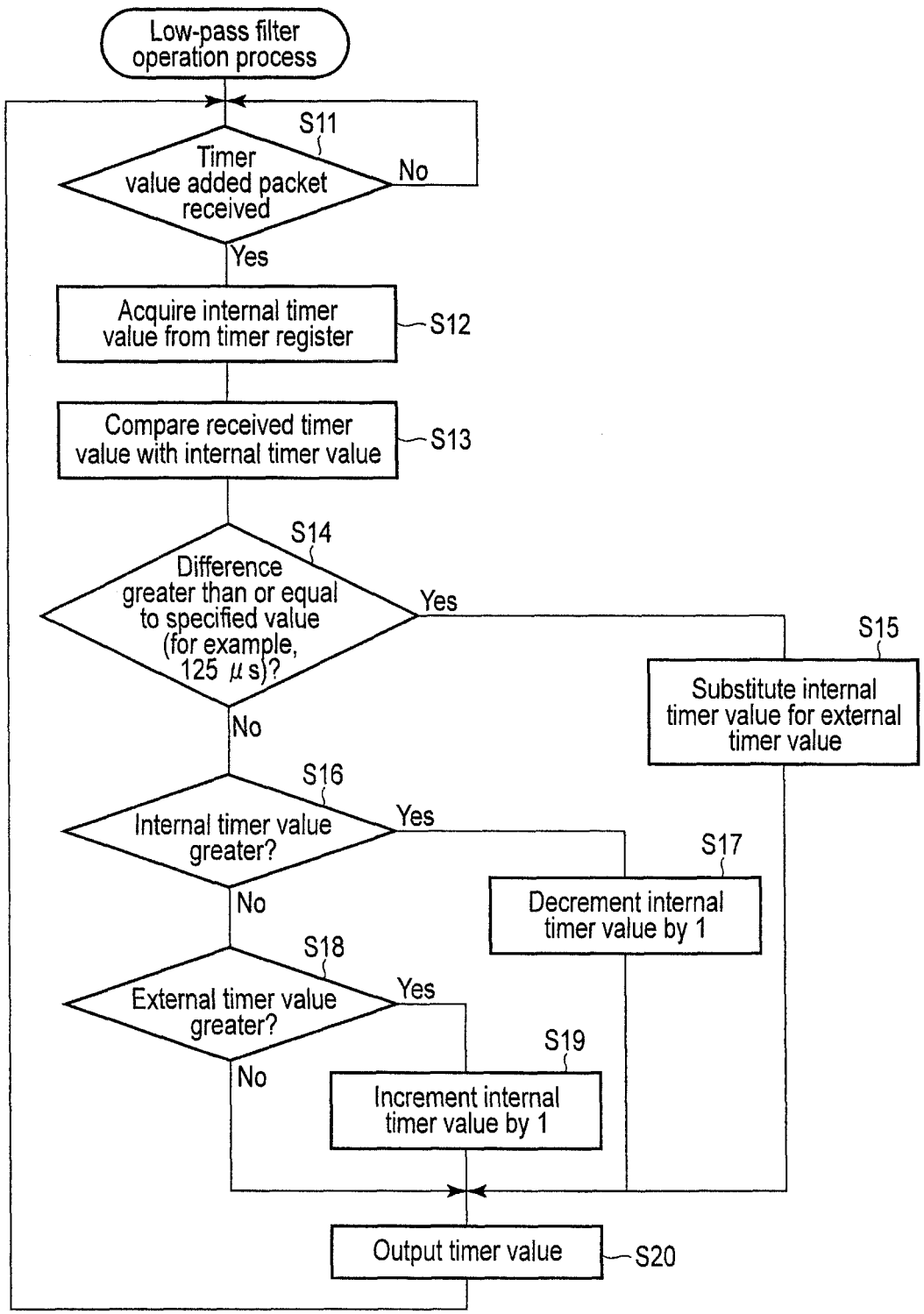
FIG. 3 is a flowchart showing process steps of a low-pass filter operation circuit used for the synchronous camera of the embodiment.
Figure 4:
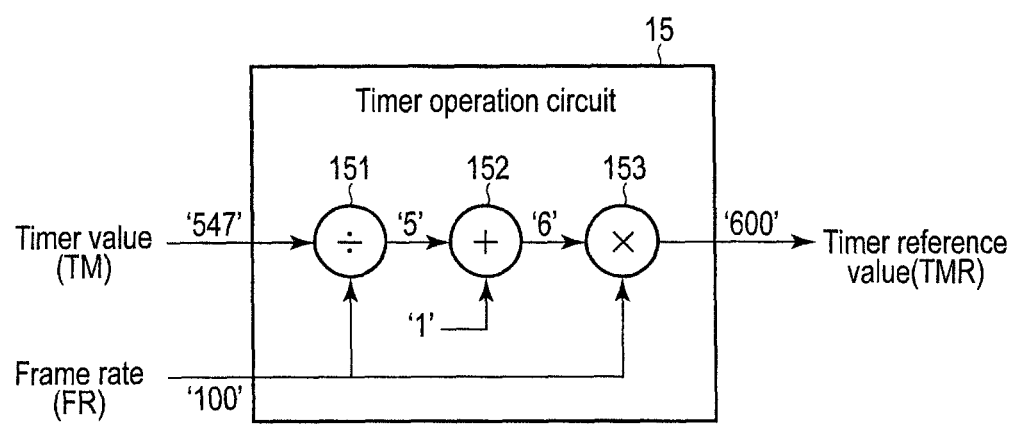
FIG. 4 is a block diagram showing the structure of a timer operation circuit used for the synchronous camera of the embodiment.

Referring to FIGS. 2 to 4, a structure of the essential part of the synchronous camera 1 according to the embodiment to which the camera system shown in FIG. 1 is applied will be described.

As shown in FIG. 2, the camera 1 having a calculation function of the timer reference value according to the embodiment comprises a serial interface circuit 11, an image sensor control circuit 12, an image sensor 13, a CPU 14, a setting condition holding module 14a, a timer operation circuit 15, and a synchronization signal generation circuit 16.

The serial interface circuit 11 comprises a packet receiving circuit 111, a packet transmitting circuit 112, a low-pass filter operation circuit 113, and a timer register 114.

The packet receiving circuit 111 receives a packet (TMP) to which the timer value is added, which has been transmitted from the external controller 2 through the serial interface bus 3, and transmits a timer value (TMS) carried by this packet (TMP) to the low-pass filter operation circuit 113. Also, at the start of the system operation, the packet receiving circuit 111 receives a packet which carries a frame rate common to the cameras 1, ..., 1 and set by the external controller 2, and transmits the frame rate carried by the packet to the CPU 14. This frame rate is held in the CPU 14.

The packet transmitting circuit 112 performs a packet transmission process of transmitting an image frame output from the image sensor control circuit 12 to the external controller 2 via the serial interface bus 3.

The low-pass filter operation circuit 113 constitutes a serial interface circuit, which enables communication conforming to the serial bus standard including IEEE 1394 and USB 3.0, together with the timer register 114, the packet receiving circuit 111, and the packet transmitting circuit 112. The low-pass filter operation circuit 113 forms a negative feedback loop 115 between the timer register 114 and has a low-pass filter operation process function. With this function, a count operation of an internal timer value (TMI) performed by the timer register 114 is temporarily stopped every time a packet (TMP) to which a timer value is added is received, and the timer value (TMS) carried by the received packet (TMP) is compared with the internal timer value (TMI) counted by the timer register 114. If a deviation of multiple counts (i.e., a deviation which is multiples of a unit count value) occurs in the count value of the timer register 113, a correction process is performed with the low-pass filter operation process function to converge the above-mentioned deviation. In this correction process the internal timer value (TMI) counted by the timer register 114 is gradually increased or decreased by a unit count value (e.g., "1") of the timer register 113. By the above process, even if temporal fluctuation in the arrival time of the packet (TMP) is caused by congestion of a bus band in the serial interface bus 3, the fluctuation can be converged and highly reliable synchronous control among cameras can be achieved for a high-speed serial bus including USB 3.0. The low-pass filter operation process function will be described later with reference to FIG. 3.

After storing the timer value obtained by the operation process by the low-pass filter operation circuit 113, the timer register 114 updates the internal timer value (TMI) at a count timing corresponding to a timer count of the external controller 2.

FIG. 3 shows the low-pass filter operation process steps of the low-pass filter operation circuit 113 described above.

The low-pass filter operation process is performed in accordance with a start of the system operation. If a packet (TMP) to which a timer value is added is received in the serial interface circuit 11 (step S11), the count operation of the timer register 114 is once stopped and the internal timer value (TMI) is obtained or acquired from the timer register 114 (step S12). Then, the timer value (TMS) carried by the received packet (TMP) is compared with the internal timer value (TMI) counted by the timer register 114 (step S13).

Here, it is determined whether the count value of the timer register 113 is greater than or equal to a predefined specified value (for example, a timer count value corresponding to a transfer period [125 µsec] of the packet [TMP]) (step S14). If a deviation greater than or equal to the specified value occurs in the count value of the timer register 113 (Yes in step S14), the internal timer value (TMI) of the timer register 114 is uniquely replaced by the timer value (TMS) carried by the received packet (TMP) (step S15).

By this process, at the start of the system operation, the timer value (TMS) carried by the initially received packet (TMP) is uniquely set as the internal timer value (TMI) in the timer register 114, and a timer count operation of the timer register 113 is started from this timer value.

In the meantime, if the count value of the timer register 113 is within the specified value (No in step S14), it is determined whether the internal timer value (TMI) is greater than the timer value (TMS) carried by the packet (TMP) (step S16). If the internal timer value (TMI) has a greater value (Yes in step S16), the timer register 113 is made to perform a subsequent timer count operation by decrementing (i.e., performing negative [−] correction) the internal timer value (TMI) by a unit count value (a value of one count) (step S17).

Further, if the count value of the timer register 113 is within the specified value (No in step S14), and the internal timer value (TMI) is smaller than the timer value (TMS) carried by the packet (TMP) (Yes in step S18), the timer register 113 is made to perform a subsequent timer count operation by incrementing (i.e., performing positive [+] correction) the internal timer value (TMI) by the unit count value (a value of one count) (step S19).

Furthermore, if the internal timer value (TMI) is equal to the timer value (TMS) carried by the packet (TMP) (No in both of steps S16 and S18), the above process is not carried out and the timer register 113 is made to perform a subsequent timer count operation as it is.

The timer value (TM) which has gone through the low-pass filter operation process is output from the timer register 113 in this way. By the low-pass filter operation process, if a deviation of multiple counts (i.e., a deviation which is multiples of the unit count value) occurs in the count value of the timer register 113, the internal timer value (TMI) counted by the timer register 114 is corrected by the unit count value (for example, 1) of the timer register 113, and is gradually converged within a plurality of bus cycles. By this process, even if temporal fluctuation in the arrival time of the packet (TMP) is caused, such temporal fluctuation can be converged. Also, even a minute deviation of the internal timer value by the internal count of each camera can be corrected accurately.

The serial interface circuit 11 which enables the serial bus connection of the synchronous camera is constituted by the packet receiving circuit 111, the packet transmitting circuit 112, the low-pass filter operation circuit 113, and the timer register 114.

The image sensor control circuit 12 controls the image sensor 13 based on a synchronization signal output from the synchronization signal generation circuit 16, acquires data on an image frame from the image sensor 13, and sends the data on the image frame to the packet transmitting circuit 112.

The image sensor 13 captures a predetermined subject in accordance with the operating condition of the camera, such as the shutter speed and/or image size, which operating condition is preset in advance, and sends the data on the captured image frame to the image sensor control circuit 12.

The CPU 14 manages the control of the camera 1 as a whole including a communication process over the serial interface bus 3. Here, the CPU 14 holds a frame rate (FR) common to the cameras 1, . . . , 1 set by the external controller 2 based on the setting conditions (operating conditions of the camera such as the shutter speed and/or the image size) held in the setting condition holding module 14a. Further, the CPU 14 supplies this frame rate (FR) to the timer operation circuit 15 so that a synchronization signal is generated at a timing common to the cameras 1, . . . , 1.

The timer operation circuit 15 performs a later-mentioned operation based on the timer value (TM) output through the low-pass filter operation from the timer register 114 and on the frame rate (FR) supplied from the CPU 14, and calculates a timer reference value (TMR), corresponding to the timing at which the synchronization is to be carried out next, common to the cameras 1, . . . , 1.

The synchronization signal generation circuit 16 generates a synchronization signal based on the timer reference value (TMR) output from the timer operation circuit 15 and the timer value (TM) output from the timer register 113. Based on the synchronization signal, image frame output control of the image sensor control circuit 12 is performed. Here, by using the timer reference value (TMR) as an output start timing of the image frame, the output control of consecutive image frames is performed in accordance with the update timing of the timer value (TM).

FIG. 4 shows internal constituent elements of the timer operation circuit 15 described above.

As shown in FIG. 4, the timer operation circuit 15 comprises an integer divider 151, an adder 152, and an integer multiplier 153.

The integer divider 151 divides the timer value (TM) output from the timer register 113 by the frame rate (FR) supplied from the CPU 14, and extracts a value of the integer part.

The adder 152 executes a rounding up process of adding an update value (1) to a value (integer value) output from the integer divider 151.

The integer multiplier 153 multiplies the output value of the adder 152 by the frame rate (FR), and calculates the timer reference value (TMR), corresponding to the timing at which the synchronization is to be carried out next, common to the cameras 1, . . . , 1.

A specific method for calculating the timer reference value (TMR) will be exemplified by referring to FIG. 4. As described above, the timer operation circuit 15 comprises the integer divider 151, the adder 152, and the integer multiplier 153. Here, an example of calculating a timer reference value, corresponding to the timing at which the synchronization is to be carried out next, common to the cameras 1, . . . , 1 is described based on a case where the timer value of the timer register 114 is "547", and the frame rate common to the cameras 1, . . . , 1 is "100".

The integer divider 151 derives "5", which is the integer value, obtained by dividing the timer value "547" by the frame rate "100". The adder 152 adds the update value "1" to "5" calculated by the integer divider 151. The integer multiplier 153 multiplies "6" calculated by the adder 152 by the frame rate "100", and derives "600" as the timer reference value (TMR), corresponding to the timing at which the synchronization is to be carried out next, common to the cameras 1, . . . , 1.

The operation of the camera 1 according to the above structure will be described. Prior to the start of the system operation, a frame rate common to the cameras 1, . . . , 1 set by the external controller 2 based on the setting conditions (operating conditions of the camera such as the shutter speed of the camera and/or the image size) held in the setting condition holding module 14a of each of the cameras 1, . . . , 1 connected to the serial interface bus 3 is transferred in a packet from the external controller 2 to each of the cameras 1, . . . , 1. Further, the frame rate carried by the packet is held in a register area of the CPU 14.

In the serial interface bus 3, packets which are mainly issued from a host periodically, such as cycle start packets in the case of IEEE 1394 or isochronous time stamp packets in the case of USB 3.0, exist. Such packets are provided for prompting synchronization of bus timing to all devices connected to the same bus, and are transmitted with the current timer value additionally written.

The packet receiving circuit 111 receives the packet (TMP) to which the timer value is added, and sends the timer value (TMS) to the low-pass filter operation circuit 113. The low-pass filter operation circuit 113 compares the received timer value (TMS) with the timer value (TMI) maintained in the timer register 114, and performs the low-pass filter operation process described before. The operation process result is saved in the timer register 114. The timer register 114 continues to perform the count operation excluding the low-pass filter operation process at the time of receiving the packet.

The timer operation circuit 15 creates the timer reference value (TMR), corresponding to the timing at which the synchronization is to be carried out next, based on the frame rate (FR) supplied from the CPU 14 and the timer value (TM) output from the timer register 114.

The synchronization signal generation circuit 16 generates a synchronization signal based on the timer value (TM) output from the timer register 114 and the timer reference value (TMR) output from the timer operation circuit 15.

The image sensor control circuit 12 receives the synchronization signal output from the synchronization signal generation circuit 16, and controls the image sensor 13 on the basis of the received synchronization signal. Also, an output image of the image sensor 13 is read, and the image frame is sent to the packet transmitting circuit 112.

The packet transmitting circuit 112 packetizes data on the image frame received from the image sensor control circuit 12 for transmission, and transmits the packetized data to the external controller 2 through the serial interface bus 3.

By such an operation, the respective cameras 1, . . . , 1 connected to the serial interface bus 3 start a transmission process of the image frame based on the timer reference value (TMR) output from the timer operation circuit 15. That is, the respective cameras 1, . . . , 1 wait until the common timer value comes to an integral multiple of a synchronization cycle, and then output the image frame. In this way, the image data output of each of the cameras 1, . . . , 1 is normalized by the common timer value, which enables mutual synchronous operation of the cameras 1, . . . , 1 to be realized, as a result.

According to the above embodiment, even if temporal fluctuation in the arrival time of the packet (TMP) to which the timer value is added is caused, the fluctuation can be converged. Thus, a camera system which enables highly reliable synchronous control among cameras which is targeted for several kinds of high-speed serial bus including USB 3.0 can be constructed easily by an economically advantageous structure.

In the embodiment described above, the external controller 2 sets a frame rate based on the setting conditions of each of the cameras 1, . . . , 1 connected to the serial interface bus 3. However, if these cameras 1, . . . , 1 operate under the same setting conditions, the CPU 14 of each of the cameras 1, . . . , 1 may be structured to calculate a frame rate common to the cameras 1, . . . , 1 based on the operating conditions such as the image size and/or the shutter speed. In other words, by making the frame rate the same in each of the cameras 1, . . . , 1, a synchronous control mechanism using the timer reference value can be realized. Also, even if the frame rates of the cameras are different from one another, when the frame rate of one camera is the integral multiple of the frame rate of the other cameras, the synchronous control using the timer reference value by the operation of the embodiment can be applied.

In addition, even in a bus interface other than IEEE 1394 and USB 3.0, if there is a bus synchronous clock equivalent to the packet (TMP) to which the timer value is added, the synchronous control mechanism using the timer reference value according to the embodiment can be realized.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A synchronous camera, which is one of a plurality of synchronous cameras connected to an external controller via a serial bus, the synchronous camera being synchronously controlled in accordance with a frame rate set by the controller based on operating conditions of the synchronous camera including shutter speed and image size, the synchronous camera comprising:

a receiver configured to receive a packet to which a timer value is added, the packet being issued from the controller at regular intervals;

a timer register configured to perform a count operation of an internal timer value corresponding to the timer value carried by the packet;

a low-pass filter operation processor configured to compare the timer value carried by the packet with the internal timer value counted by the timer register, and to correct the internal timer value so that it becomes close to, or matches, the timer value carried by the packet, by reducing or increasing the internal timer value based on a deviation between the timer value carried by the packet and the internal timer value;

an operator configured to calculate a timer reference value common to the plurality of cameras connected to the serial bus, based on the internal timer value output from the timer register and the frame rate; and a transmitter configured to transmit a captured image frame to the controller via the serial bus, based on the timer reference value calculated by the operator.

2. The synchronous camera of claim 1, wherein the low-pass filter operation processor comprises hardware logic, which is configured to:

form a negative feedback loop between the low-pass filter operation processor and the timer register;

compare the timer value carried by the packet with the internal timer value counted by the timer register; and reduce or increase the internal timer value via the count operation of the timer register by one count timer value, based on the deviation, each time the packet to which the timer value is added is received.

3. The synchronous camera of claim 1, wherein the operator comprises:

an integer divider configured to calculate an integer value obtained by dividing the internal timer value by the frame rate;

an adder configured to add a fixed update value to the value calculated by the divider; and an integer multiplier configured to multiply a value obtained by addition in the adder by the frame rate, and wherein the timer reference value is obtained by the integer multiplier.

4. The synchronous camera of claim 1, wherein the low-pass filter operation processor constitutes a serial interface circuit, which enables communication conforming to a serial bus standard including IEEE 1394 and USB 3.0, together with the timer register, the receiver, and the transmitter.

5. The synchronous camera of claim 1, wherein each of the plurality of synchronous cameras receives respective frame rates from the external controller.

* * * * *